United States Patent [19]
Katoh et al.

[11] Patent Number: 5,682,867
[45] Date of Patent: Nov. 4, 1997

[54] FEEDBACK CONTROL SYSTEM FOR MARINE PROPULSION ENGINE

[75] Inventors: Masahiko Katoh; Kimihiro Nonaka; Kazuhiro Nakamura, all of Hamamatsu, Japan

[73] Assignee: Sanshin Kogyo Kabushiki Kaisha, Hamamatsu, Japan

[21] Appl. No.: 764,999

[22] Filed: Dec. 16, 1996

Related U.S. Application Data

[62] Division of Ser. No. 402,193, Mar. 10, 1995, Pat. No. 5,622,158.

[30] Foreign Application Priority Data

| Mar. 10, 1994 | [JP] | Japan | 6-40065 |
| Mar. 10, 1994 | [JP] | Japan | 6-40066 |
| Mar. 10, 1994 | [JP] | Japan | 6-40067 |
| Mar. 10, 1994 | [JP] | Japan | 6-40068 |

[51] Int. Cl.$^6$ .................................................. F02D 41/00
[52] U.S. Cl. ............................................................ 123/676
[58] Field of Search ................................. 123/676, 571, 123/478, 492, 73 R, 488; 610/276

[56] References Cited

U.S. PATENT DOCUMENTS

| 5,193,513 | 3/1993 | Marko et al. | 123/571 |
| 5,215,068 | 6/1993 | Kato | 123/676 |
| 5,216,881 | 6/1993 | Anlauf et al. | 60/276 |
| 5,239,965 | 8/1993 | Ninomiya | 123/492 |
| 5,284,118 | 2/1994 | Kato et al. | 123/478 |
| 5,329,907 | 7/1994 | Nonaka | 123/478 |
| 5,349,936 | 9/1994 | Uchinami | 123/676 |
| 5,385,134 | 1/1995 | Krohm et al. | 123/676 |
| 5,390,649 | 2/1995 | Meiner et al. | 123/676 |
| 5,427,083 | 6/1995 | Ahern | 123/676 |
| 5,622,158 | 4/1997 | Katoh et al. | 123/676 |

Primary Examiner—Raymond A. Nelli
Attorney, Agent, or Firm—Knobbe, Martens, Olson & Bear LLP

[57] ABSTRACT

A number of embodiments of feedback control systems for maintaining the desired air fuel ratio in a marine propulsion engine that has an exhaust system for exhausting the exhaust gases to the atmosphere through an underwater exhaust gas discharge and wherein the discharge is adjustable relative to the associated watercraft. Conditions which will change the back pressure in the exhaust system are measured and the amount of fuel air ratio supplied to the engine by a feedback control system is varied, depending upon the sensed airflow and the sensed condition of the exhaust outlet that may affect back pressure and, accordingly, the ideal air fuel ratio. Spark ignition timing is also changed and the air fuel ratio may be corrected depending upon exhaust back pressure.

44 Claims, 17 Drawing Sheets

Fuel Injection Duration

FEEDBACK CONTROL SYSTEM FOR MARINE PROPULSION ENGINE

This application is a divisional of U.S. patent application Ser. No. 08/402,193, filed Mar. 10, 1995, now U.S. Pat. No. 5,622,158.

BACKGROUND OF THE INVENTION

This invention relates to an engine control system and method and more particularly to an improved feedback control system and method for a marine propulsion engine.

The control of an engine is extremely important in ensuring good running. In addition to providing the appropriate and desired output for the engine under a wide variety of running conditions, engine control are important in ensuring good fuel economy and also effective exhaust emission control. Therefore, it has been proposed to provide engines with sensors which sense the actual air-fuel ratio of the engine and make adjustments through a feedback control system so as to ensure that the air-fuel ratio is obtained at the desired amount.

Although this theory may be relatively simple, the application of this principle is not quite as straightforward. The problem is particularly acute in conjunction with marine propulsion engines. Unlike land vehicles, the exhaust gases from a marine propulsion engine are frequently discharged, under at least some running conditions, below the level of water in which the associated watercraft is operating. This underwater exhaust gas discharge is employed so as to assist in exhaust silencing.

With land vehicles the condition at the exhaust discharge generally is maintained fairly constant under all running conditions. That is, there are not outside factors which will affect the ability of the exhaust system to discharge the exhaust gases under most normal conditions. However, when the exhaust gases are discharged beneath the water, as with a marine propulsion engine, then the condition at the exhaust outlet can vary significantly.

One way in which the condition can vary is that the depth of the underwater exhaust gas discharge is not constant during the running of the watercraft that is powered by the engine. In fact, the variations are not even linear in relation to speed. The reason for this is that many watercraft use so-called "planing-type" hulls that operate fairly deeply submerged under low-speed conditions. However, as the speed increases and the watercraft goes on plane, the water level can change suddenly relative to the location of the exhaust gas outlet. This can have a significant effect on the performance.

It is, therefore, a principal object of this invention to provide an improved feedback control for a marine propulsion engine, that takes into account the pressure at the exhaust gas discharge.

It is a further object of this invention to provide an improved feedback control for a marine propulsion engine wherein the depth of submersion of the exhaust outlet is factored into the feedback control variables.

In addition to the depth of the exhaust outlet in marine applications, the exhaust gases are frequently discharged, particularly under high-speed operation, through a through-the-propeller or through-the-hub exhaust gas discharge. However, when the watercraft is propelled by a propeller, it is the normal practice to mount the propeller so that its trim position can be adjusted. That is, the angle of axis of rotation of the propeller relative to the transom is varied. This is done both in outboard motors and in the outboard drive portion of an inboard/outboard drive. These types of drives are referred to generally as marine outboard drives.

In addition to changing the depth of submersion, the trim adjustment changes the angle at which the exhaust gases are discharged relative to the water level. Hence, the back pressure on the exhaust gases can vary with the trim angle, even if the depth is maintained uniform.

It is, therefore, a still further object of this invention to provide an improved feedback control for a marine propulsion engine wherein the trim angle of the drive is considered in setting the feedback control.

The types of feedback control employed generally control the air-fuel mixture by controlling the amount of fuel in response to the output of the sensor. The sensor is frequently an exhaust sensor, such as an $O_2$ sensor, that emits a signal which is indicative of the richness or leanness of the mixture. If the feedback control is done only as a function of the output of this sensor, the control may not be as effective because it disregards the other factors noted above.

It is, therefore, a still further object of this invention to provide an improved feedback control system and method for a marine propulsion engine that takes into account exhaust back pressure and other factors which may affect it.

It has also been discovered that merely changing the amount of fuel supplied to the engine does not necessarily achieve the complete results desired. For example, with spark-ignited engines it has been found that the spark advance should also be altered in response to the feedback signal. Like the fuel-ratio variation, spark advance control also depends upon factors of exhaust gas pressure and other things that may affect it.

It is, therefore, a still further object of this invention to provide an improved feedback control system for the spark timing which is dependent upon factors affecting exhaust back pressure.

In controlling the air-fuel ratio, it is necessary, of course, to provide a good indication of air flow to the engine so that the fuel flow that is varied can be varied in proportion to air flow. With two-cycle engines, a type of engine frequently employed in marine propulsion applications, it has been noted that the amount of air flow to the engine can be accurately determined by measuring the pressure in the crankcase chamber at particular crank angles. Therefore, many engine control systems employ crankcase pressure sensors so as to control the amount of fuel supplied.

It has been discovered, however, that the exhaust back pressure also can vary the accuracy of the crankcase pressure sensor in determining the accurate airflow to the engine.

It is, therefore, a still further object of this invention to provide an improved feedback control system where the airflow is measured by crankcase pressure and wherein adjustments are made in the air flow determination based upon factors which affect the back pressure in the exhaust system.

In engines that have plural cylinders, frequently the engine is supplied with an exhaust system that includes a manifold that collects exhaust gases from a number of exhaust ports and delivers it to the atmosphere through a common exhaust gas opening of the exhaust system. With these systems and with particular applications the distance between the exhaust gas opening and the exhaust ports of the individual cylinders may be different. This is a problem that is particularly acute in conjunction with marine propulsion applications due to the compact nature of the exhaust system that must be employed for these applications. This difference in length can be particularly significant in conjunction with two-cycle engines, wherein exhaust pulses can have a significant effect on the charging of the individual cylinders. This is caused in part by the substantial overlap between the opening of the scavenger port and the closing of the exhaust port. When utilizing a feedback control, the collected flow of the exhaust gases is normally measured, and this is used for determining the air-fuel ratio. As a result, although the average for the system may be acceptable, individual cylinders are not supplied with the appropriate air-fuel mixture.

It is, therefore, a still further object of this invention to provide an improved feedback control system for an engine having plural cylinders served by a common exhaust system and wherein the feedback control is varied on a cylinder-by-cylinder basis.

It is frequently the practice to use a common basic engine architecture for a family of engines. The engines within the family provide different power outputs or different performance by varying the accessories and components associated with the engine. Although this has advantages, it also has disadvantages. For example, it is necessary for the manufacturer, distributors, and dealers to stock a wide variety of parts to serve different engines of a common family. In addition, it makes it difficult to judge and meet consumer preferences for varying desires. That is, more engines of one particular type may be desired in one year than in another year.

It is, therefore, a still further object of this invention to provide a control system for an engine wherein the basic structure of the engine is the same and its performance is varied only by the control strategy employed so as to provide a family of engines which is substantially identical in structure.

SUMMARY OF THE INVENTION

A first feature of the invention is adapted to be embodied in a fuel control method and apparatus for a marine propulsion internal combustion engine. The engine is provided with a fuel supply device for supplying fuel to the engine for combustion. The engine has an exhaust port for discharging combustion products therefrom. An exhaust system collects the exhaust gasses from the engine and discharges them to the atmosphere at least in part below the level of water in which the propelled vessel is operating at least under certain running conditions. A sensor is provided for sensing the air-fuel ratio supplied to the engine by the fuel supply device.

In accordance with a method for practicing this invention, the fuel is supplied to the engine by the fuel supply device. The output of the sensor is employed for adjusting the amount of fuel supplied to the engine in response to the output of the sensor to maintain the desired air-fuel ratio. Means are provided for sensing a condition which will effect the back pressure in the exhaust system, and the amount of fuel supplied is adjusted in response to the sensed condition that will effect the back pressure.

A method of practicing the invention comprises the steps of applying fuel to the engine by the fuel supply device. The output of the sensor is read, and the amount of fuel supplied to the engine is varied in response to the output of the sensor to maintain the desired air-fuel ratio. A condition which will effect the back pressure in the exhaust system is also sensed and the amount of fuel supplied is adjusted in response to this sensed condition.

Another feature of the invention is adapted to be embodied in a fuel control method and apparatus for a two-cycle crankcase compression marine propulsion engine having a crankcase chamber containing a crankshaft. A fuel supply device is provided for supplying fuel to the engine for combustion. A crankcase pressure sensor senses the pressure in the crankcase chamber. The engine has an exhaust port from which exhaust products are discharged. An exhaust system collects the exhaust gases from the engine exhaust port and discharges them to the atmosphere at least in part below the level of water in which the propelled vessel is traveling under at least certain running conditions. In accordance with an apparatus for practicing this facet of the invention, the crankcase pressure is measured at a predetermined crankshaft angle so as to provide an indication of air flow for controlling the amount of fuel supplied by the fuel supply device. A further sensor is provided for sensing a condition which will effect exhaust gas pressure, and the airflow calculation is corrected depending upon the sensed condition.

In accordance with a method for practicing this facet of the invention, the amount of air flowing to the engine is determined by measuring the crankcase pressure at a predetermined crankshaft angle. In addition, a condition is sensed which will effect exhaust gas back pressure, and the amount of fuel supplied to the engine is varied in response to the computed air flow and the back pressure condition.

A further feature of the invention is adapted to be embodied in an apparatus and method for an internal combustion engine having a plurality of cylinders. A fuel supply device is provided for supplying fuel to the engine for combustion. A plurality of exhaust ports in the engine discharge combustion products from the individual cylinders thereof. An exhaust system collects the exhaust gases from the engine exhaust ports and discharges them to the atmosphere through a common exhaust opening. A sensor senses the air-fuel ratio supplied to the engine by the fuel supply device.

An apparatus for controlling the engine includes means for controlling the amount of fuel supplied to the engine by the charge-forming system in response to the output of the sensor. The amount of fuel supplied to the engine is varied in response to the output of the sensor to maintain the desired air-fuel ratio, but the amount of fuel supplied to each cylinder is varied, dependent upon the distance of that cylinder's exhaust port from the exhaust outlet so as to maintain the appropriate air-fuel ratio in each cylinder.

A method for practicing this invention comprises the steps of adjusting the amount of fuel supplied to the engine in response to the output of the sensor. The amount of fuel supplied to each cylinder is varied, dependent upon its distance from the exhaust outlet so as to compensate for these differences and maintain the desired air-fuel ratio for each cylinder.

Another feature of the invention is adapted to be embodied in a method for operating engines and an engine that can be used for a variety of applications requiring different outputs of the engine. The engine includes a number of cylinders, a fuel supply system for supplying fuel to the cylinders, and an ignition system for firing the charge in the cylinders.

In accordance with an apparatus for practicing the invention, the specific output of the engine is varied to provide the desired performance by changing the control strategy of at least one of the fuel supply system and the ignition system.

In accordance with a method for practicing the invention, the different outputs required from the engine are achieved for the respective applications by varying one of the fuel control and ignition systems.

DETAILED DESCRIPTION OF THE PREFERRED EMBODIMENTS OF THE INVENTION

Figure 1:
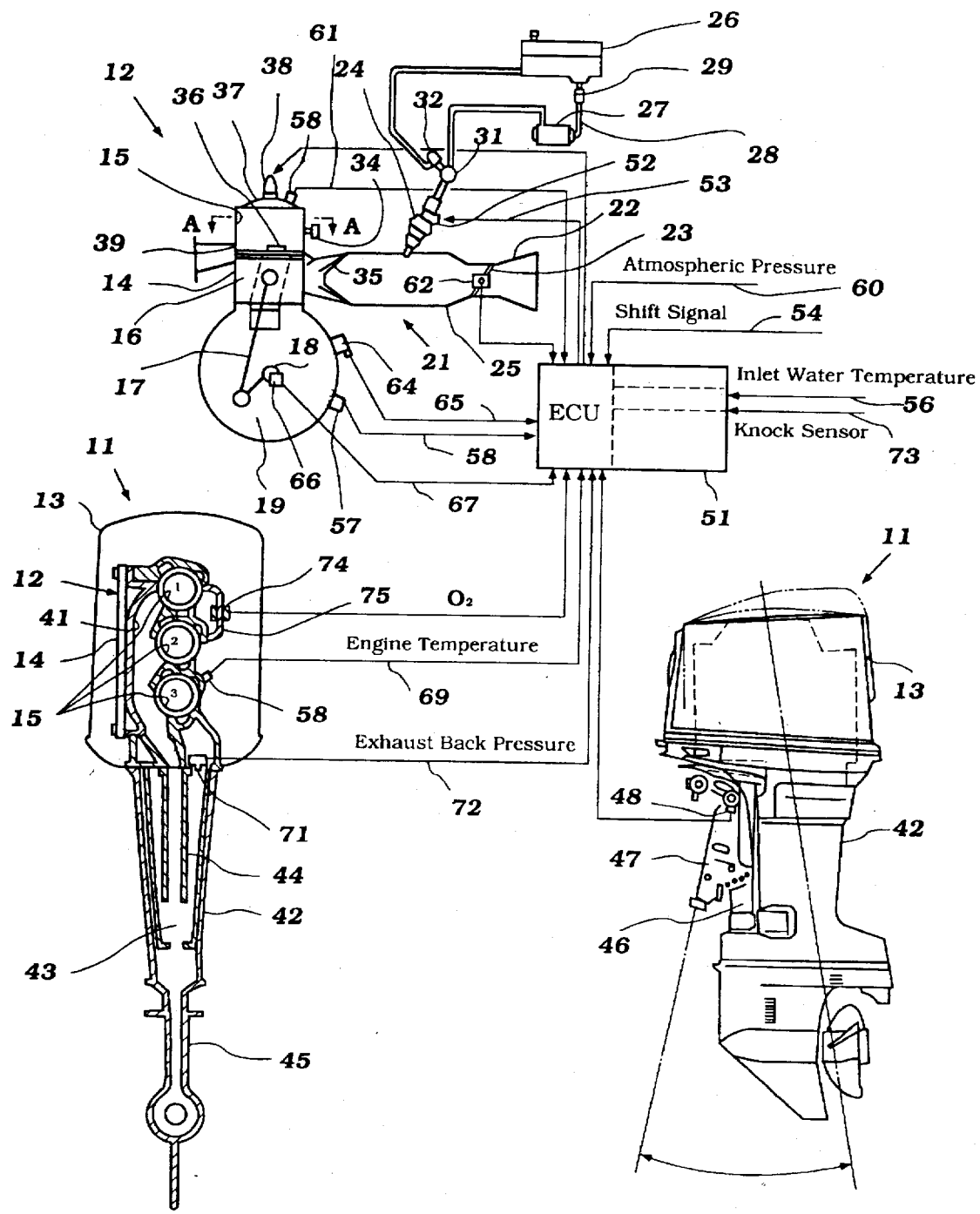
FIG. 1 is a partially schematic view of an outboard motor constructed and operated in accordance with an embodiment of the invention, with the outboard motor being shown in side elevation, in a vertical cross section, and schematically in a horizontal cross section so as to show the interrelationship of all of the components.

Referring now in detail to the drawings and initially to FIG. 1, an outboard motor is identified generally by the reference numeral 11. This view is composite view showing the complete outboard motor 11 in side elevation in a fully trimmed down position, in a vertical cross section about a plane perpendicular to the side elevation and schematically with a single cylinder of the powering internal combustion engine is shown in cross section. The engine is identified generally by the reference numeral 12 and the associated fuel injection system for it shown partially in cross section and partially schematically.

The invention is described in conjunction with an outboard motor only as a typical environment in which the invention may be practiced. The invention has particular utility with two cycle crankcase compression internal combustion engines and since such engines are frequently employed as the power plants for outboard motors, an outboard motor is a typical environment in which the invention may be employed. The invention also has particular utility in conjunction with the use of engines for powering watercraft wherein at least a portion of the exhaust gases are delivered through an underwater exhaust gas discharge. This type of exhaust system is utilized with either outboard motors or with the stern drive portion of inboard/outboard drives, as has already been noted.

The outboard motor 11, as already noted, includes a powering internal combustion engine 12 which, in the illustrated embodiment, is comprised of a three cylinder in-line engine. It will be readily apparent to those skilled in the art how the invention can be employed in conjunction with engines of other configurations.

The engine 12 forms a portion of the power head of the outboard motor and this power head is completed by a protective cowling 13 which surrounds the engine 12 in a known manner. As may be seen in the lower left hand view of this figure, the engine 12 is comprised of a cylinder block 14 in which three aligned cylinder bores 15 are formed. Pistons 16 reciprocate in the cylinder bores 15 and are connected to connecting rods 17 which, in turn, drive a crankshaft 18 in a well known manner. The crankshaft 18 is rotatably journaled within a crankcase assembly which is divided into individual chambers 19 each associated with a respective one of the cylinder bores 15 and which are sealed from each other in a manner well known in this art.

A fuel/air charge is delivered to the crankcase chambers 19 by an induction system, indicated generally by the reference numeral 21, and which includes an atmospheric air inlet 22 in which a manually operated throttle valve 23 is positioned. Electronically operated fuel injectors 24 spray fuel into an intake manifold 25 downstream of the throttle valve 23. The fuel injectors 24 receives fuel from a fuel system including a remotely positioned fuel tank 26. Fuel is drawn from the fuel tank 26 by means of a high pressure fuel pump 27, through a conduit 28 in which a filter 29 is positioned. This fuel then delivered to a fuel rail 31 in which a pressure regulator 32 is provided. The pressure regulator 32 maintains the desired pressure in the fuel rail by bypassing excess fuel back to the fuel tank 26 through a return conduit 33. The operation of the fuel injector 24 will be described in more detail later.

The intake manifold 25 delivers air to the intake ports 34 of the engine through reed type check valves 35 which operate to preclude reverse flow. The inducted charge is drawn into the crankcase chambers 19 upon upward movement of the pistons 16 and then is compressed upon downward movement. The compressed charge is then transferred to the area above the pistons 16 through a plurality of scavenge passages 36 in a manner well known in this art.

A cylinder head 37 is affixed to the cylinder block 14 in a known manner and defines a recess which forms part of the combustion chamber. A spark plug 38 is mounted in each cylinder recess and is fired by the ignition system in a known manner.

The cylinder block 14 is formed with an exhaust port 39 for each cylinder which communicates with an exhaust manifold 41 formed in part in the cylinder block 14.

As is typical with outboard motor practice, the cylinder block 14 and cylinder head 37 are formed with cooling jackets through which coolant is circulated from the body of water in which the outboard motor 11 is operating in any conventional manner.

A driveshaft housing 42 depends from the power head and rotatably journals a driveshaft which is driven by the engine crankshaft 18 in a known manner. The driveshaft housing 42 is formed with an internal expansion chamber 43 to which exhaust gases are delivered from the exhaust manifold 41 by an exhaust pipe 44. Any suitable internal baffling and cooling system is provided for the exhaust gases and they are then discharged through a conventional underwater high speed exhaust gas discharge, which may comprise an outlet formed in the lower unit 45 or in the hub of a propeller driven by the driveshaft. In addition, an above the water, low speed gas discharge may be incorporated.

As is typical with outboard motor practice, a steering shaft (not shown) is connected to the driveshaft housing 42 in a known manner. This steering shaft is journaled for steering movement about a generally vertically extending steering axis within a swivel bracket 46. The swivel bracket 46 is, in turn, pivotally connected to a clamping bracket 47 for tilt and trim movement about a horizontally disposed axis by a pivot pin 48. The lower right hand side view of FIG. 1 shows the outboard motor 11 in a fully trimmed down position where it is disposed at the angle β to the transom of the associated watercraft. The trim may be adjusted in any known manner.

In addition, the pivotal connection 48 permits the outboard motor 11 to be tilted up out of the water when not in use. For control purposes, as will be described, a trim position indicator 49 is mounted to cooperate between the clamping bracket 47 and swivel bracket 46 to provide an output signal to an ECU, indicated generally the reference numeral 51. The total control strategy will be described later.

The construction of the outboard motor 11 and its powering internal combustion engine 12 as thus far described may be considered to be conventional and all of the components which have been illustrated may be of any conventional type. Since the invention deals with the fuel injection and spark control systems for the engine and their control, it is believed unnecessary to described in further detail the components of the engine which may be considered to be conventional.

Referring now in more detail to the fuel injection system and the control therefor, as previously noted, the fuel injectors 24 are electronically controlled. To this end, it is provided with an electrical terminal 52 that receives an output control signal from the ECU, through a conductor indicated the line 53. A solenoid of the fuel injectors 24 is energized when the ECU 51 outputs a signal to the terminal 51 through the line 53 to open an injection valve and initiate injection. Once this signal is terminated, injection will also be terminated. The injectors 24 may be of any known type and in addition to a pure fuel injectors may comprise an air/fuel injectors.

A number of ambient atmospheric conditions are supplied to the ECU 51 and certain engine running conditions are supplied to the ECU 51 so as to determine the amount of fuel injected and the timing of the fuel injection. These ambient conditions may comprise atmospheric pressure which is measured in any suitable manner by a sensor and which signal is transmitted to the ECU 51 through a conductor 60, temperature of the intake cooling water which is delivered to the engine cooling jacket from the body of water in which the watercraft is operating as sensed by an appropriate sensor (not shown) and transmitted through to the ECU 51 through a conductor 56, and the intake air temperature is sensed in the crankcase chamber 19 by a temperature sensor 57 which outputs its signal to the ECU 51 through a conductor 58. Additional ambient conditions may be measured and employed so as to provide more accurate control of the fuel injection, if desired.

There are also provided a number of engine condition sensors which sense the following engine conditions. An in-cylinder pressure sensor 59 senses the pressure within the cylinder and outputs this signal to the ECU 51 through a conductor 61. A throttle valve position sensor 62 senses the position of the throttle valve 23 and outputs this signal to the ECU 51 through a conductor 63. Crankcase pressure is sensed by a pressure sensor 64 which is also mounted in the crankcase chamber 19 and outputs its signal to the ECU 52 through a conductor 65. Crank angle position indicative of the angular position and rotating speed of the crankshaft 18 is determined by a sensor 66 and outputted to the ECU 51 through a conductor 67. Engine temperature is sensed by a sensor 68 mounted in the cylinder block 14 and inputted to the ECU 51 through a conductor 69. Exhaust system back pressure in the expansion chamber 43 is sensed by a sensor 71 and is outputted to the ECU 54 through a conductor 72. Finally, a knock sensor (not shown) output a signal to the ECU 51 when a knocking condition is sensed through the conductor 73. As with the ambient conditions, additional engine running conditions may be sensed. Those skilled in the art can readily determine how such other ambient or running conditions can be sensed and fed to the ECU 51 and processed by the ECU 51 to determine the fuel injection supply both in timing and amount.

As is disclosed in U.S. Pat. No. 4,461,260 entitled "Fuel Injection System For Two-Cycle Internal Combustion Engines," issued Jul. 24, 1984, the airflow to the engine can be accurately measured by the crankcase pressure sensor 64 when the pressure reading is taken at a specific crankshaft angle as set forth therein. However, as will be discussed below, it has been discovered that the back pressure in the exhaust system as sensed by the sensor 71 will effect the accuracy of the crankcase pressure in indicating air flow. As will be described later, a correction is made for this condition as well as trim angle condition as sensed by the sensor 49.

A transmission condition sensor (Not Shown) for the transmission in the lower unit also sends a transmission position (F, N or R) to the ECU 51 through a conductor 54.

Finally, the engine control and particularly the air fuel ratio is controlled by controlling the timing of the beginning of injection by the fuel injectors 24 and the duration of injection through a feedback control system. This system includes an oxygen sensor 74 that is placed in a bypass passage 75 that interconnects the exhaust passages from two adjacent cylinders and is located in a location wherein it will be least effected by exhaust system back pressure.

The ECU 51 is programmed to provide a feedback control system based upon the output of the oxygen sensor 74 and any other engine factors in a conventional manner. However, in accordance with an important feature of the invention, this feedback control is modified based upon certain factors which will tend to cause the output from the oxygen sensor 74 not to be truly indicative of the actual conditions that determine the appropriate air fuel ratio. Generally the system is designed to maintain a stoichiometric mixture where actual air fuel ratio divided by stoichiometric is equal to 1 ($\lambda$=1), but it has been found that the desirable feedback control of the fuel mixture and the spark advance are also effected by actual exhaust system back pressure as sensed by the sensor 71.

Figure 2:
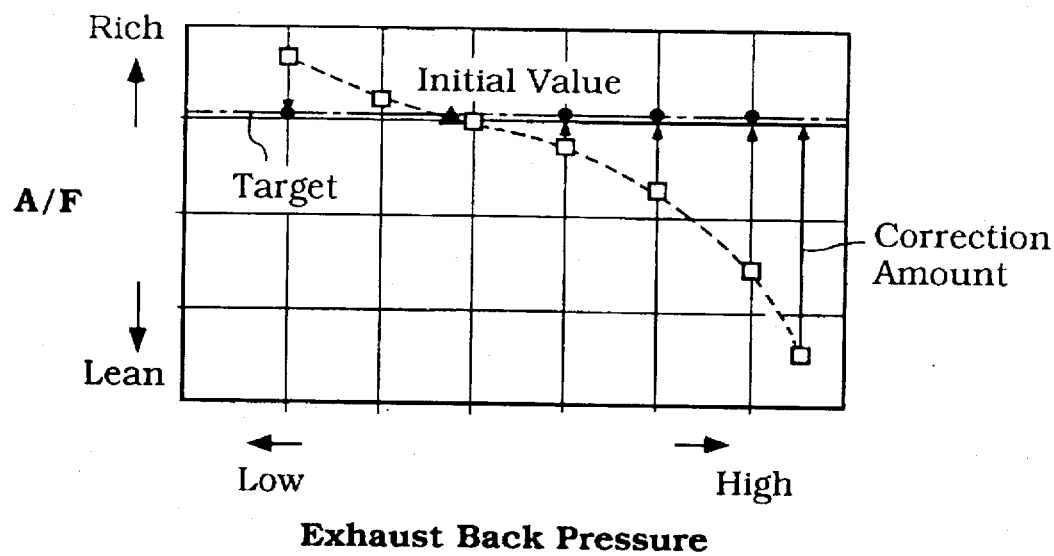
FIG. 2 is a graph showing the air-fuel ratio corrections relative to exhaust gas back pressure, with the target air-fuel ratio being shown by the broken line and the corrective amount required indicated.

This may be understood by reference to FIG. 2, which is a graphical view showing air fuel ratio in relation to exhaust back pressure. Shown on this graph is standard of initial value at idle condition. It will be seen that if the exhaust gas pressure falls below normal, the exhaust gases can flow more freely and the air flow into the cylinder will be greater so that the mixture tends to become lean. Therefore, if the exhaust back pressure falls below the initial value, then the system should add to the fuel supplied so as to compensate for its leanness.

On the other hand, if the back pressure raises, then the flow of exhaust gases is retarded and the air intake amount is decreased and the mixture tends to become rich. Therefore, the system leans the fuel from what would normally be provided under this condition in order to maintain stoichiometric conditions. It should be noted that in this description it is assumed that the desired air fuel ratio is stoichiometric. However, where this term is used, it is to understood that it could equally be the desired air fuel ratio which might be on the lean or rich side, depending upon the particular engine design.

Figure 3:
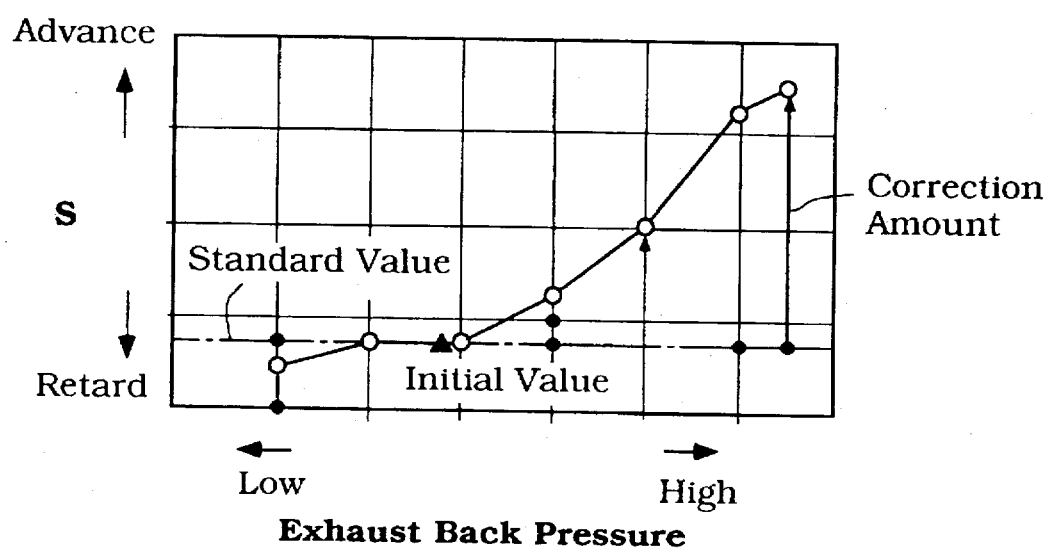
FIG. 3 is a graphical view showing the spark timing correction in response to exhaust gas pressure, with the standard initial value and the corrective amounts to accommodate back pressure being shown.

In a similar manner and as shown in FIG. 3, the ideal spark timing also is dependent upon exhaust back pressure. If the pressure falls below the normal or designed value, then the spark should be retarded because flame will tend to propagate faster and this is done so as to avoid the peak pressure occurring at the incorrect time. On the other hand, if back pressure rises, then the flame will propagate slower and the spark should be advanced.

Figure 4:
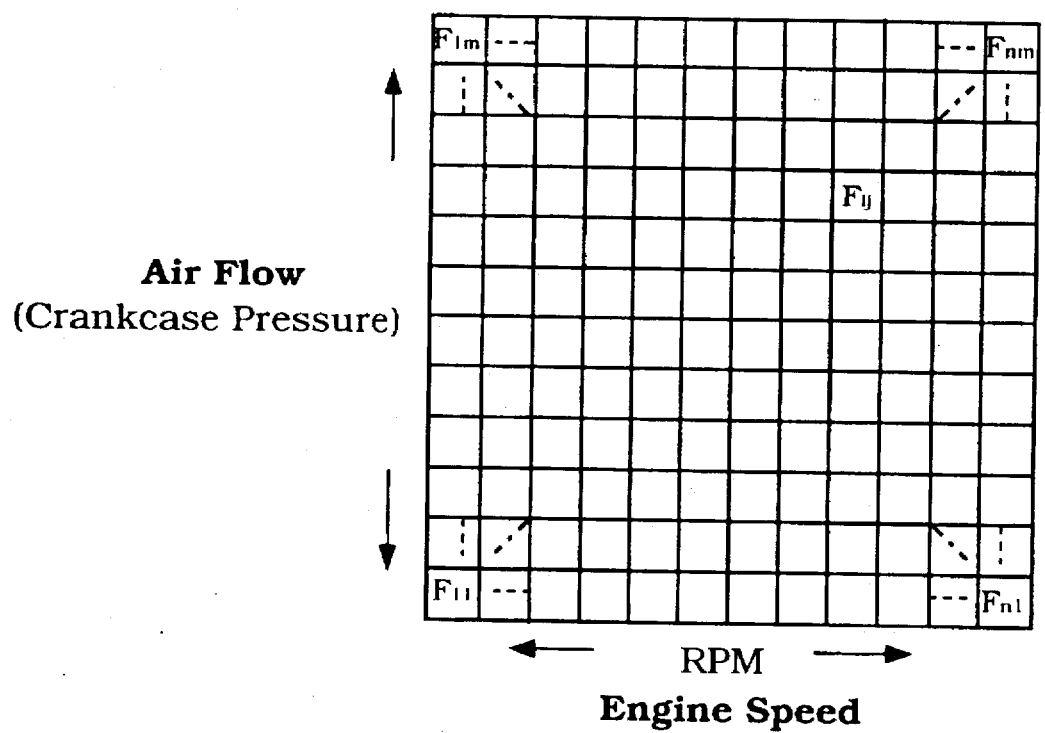
FIG. 4 is a view showing the map of fuel injection amount in response to air flow, as determined by crankcase pressure at a particular crank angle, and engine speed.

The strategy by which the system operates will now be described by reference to FIGS. 4-6. FIG. 4 is a map which is pre-programmed into the ECU 51 and shows the amount of fuel that should be supplied for various induction system air flows and engine speeds. As has been previously noted, the air flow to the engine is calculated in accordance with the described embodiment by taking the pressure in the crankcase chamber from the pressure sensor 64 at a specific crank angle.

Figure 5:
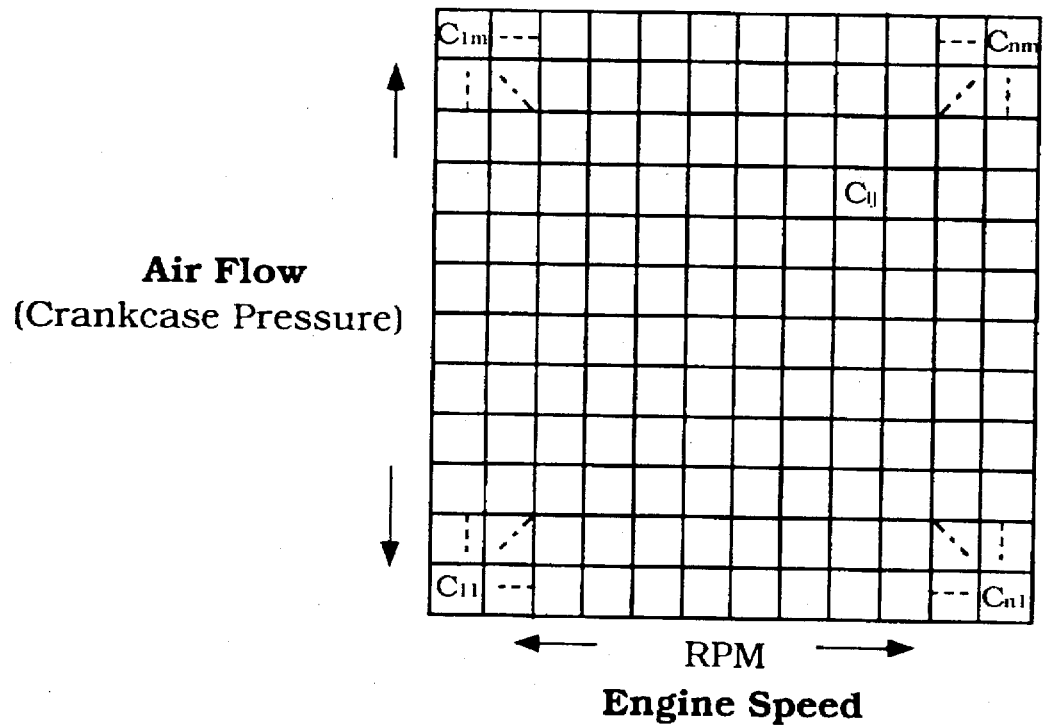
FIG. 5 is a graph showing the corrective amount of fuel injection in response to the same parameters as FIG. 5, i.e., air flow and engine speed.
Figure 6:
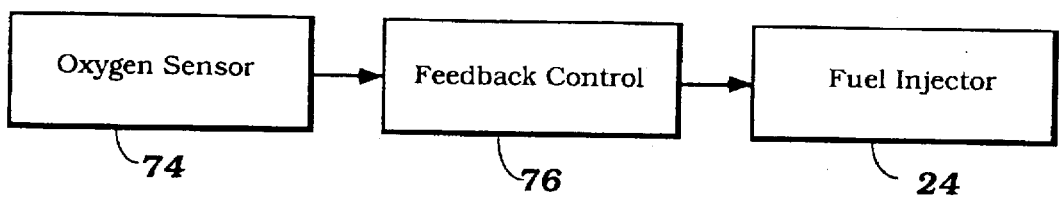
FIG. 6 is a block diagram showing the relationship of the oxygen sensor, feedback control, and fuel injector.

FIG. 5 is a graph showing the corrective factors in relation to engine speed and air flow from data that is obtained by actually measuring the situation with various back pressures that will exist under these conditions and other variable which may be employed such as transmission condition for the corrective factor. As may be seen in FIG. 6, the output from the oxygen sensor 74 is supplied to the feedback control system, which is identified by the reference numeral 76 in this figure, which, in turn, outputs its signal to the terminal 52 of the fuel injector 24 so as to control both the timing and duration of fuel injection. These features will be described later by reference to another embodiment wherein the performance of the engine 12 can be varied by changing fuel injection timing, duration and spark timing.

Figure 7:
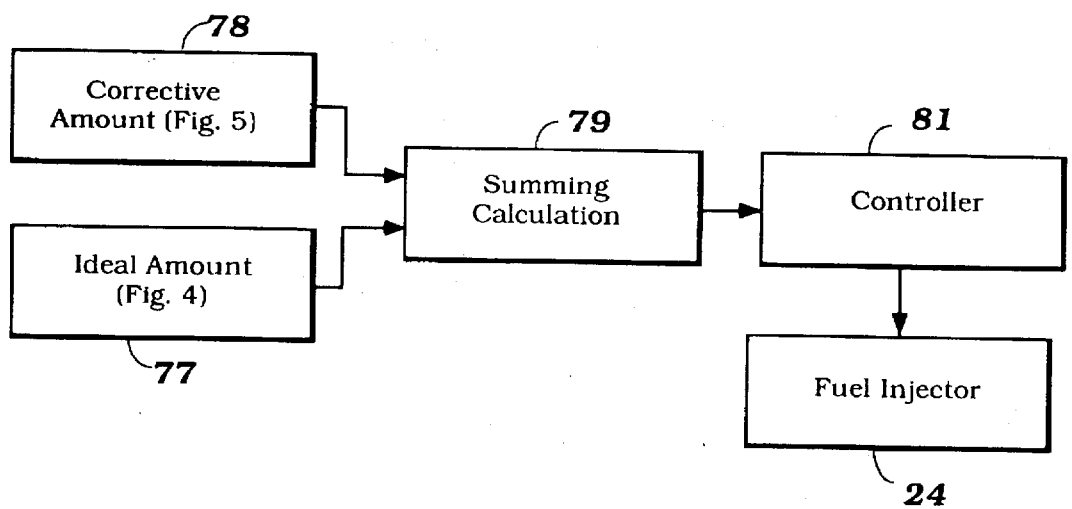
FIG. 7 is a block diagram showing how the map values of FIGS. 4 and 5 are combined to output a signal to the controller for controlling the fuel injector in response to sensed engine conditions and corrective factors based upon exhaust gas back pressure.

FIG. 7 is a graphical view showing how the actual correction is made in the ECUs 51. The ideal fuel amount for the engine running condition is read at the section 77 from the map of FIG. 4. At the same time or subsequently, the corrective amount of fuel is read at the section 78 from the map of FIG. 5. These values are then transmitted to a summing calculator section 79 which sums the values and outputs a signal to a controller 81 which then outputs its signal to the fuel injector 24 so as to inject the appropriate amount of fuel.

Figure 8:
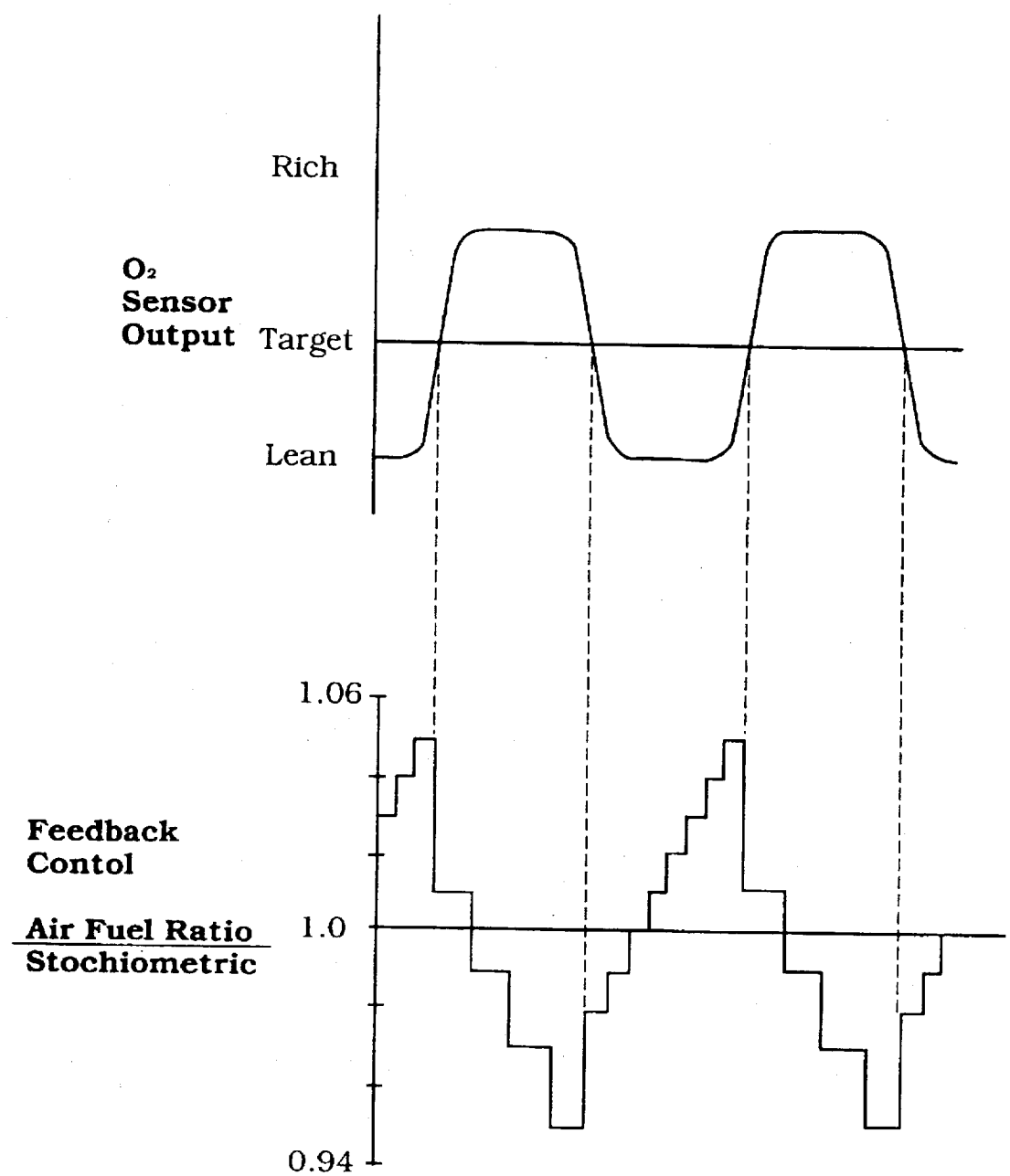
FIG. 8 is a graphical view showing the output signal of the oxygen sensor and the resulting feedback control routine in relation to time.

FIG. 8 is a graphical view showing how the feedback control is obtained with the feedback control system. The top portion of the graph shows the output of the oxygen sensor while the bottom portion shows the adjustments being made to vary the fuel air ratio from stoichiometric, indicated at 1. The oxygen sensor depicted is of the type which outputs a voltage signal which is between 0 and 1 volts. The condition at approximately 500 millivolts is indicative that the mixture has gone rich.

Starting at the left hand side of this graph, it will be seen that the mixture has been lean and accordingly the feedback control has been enriching the mixture in steps. However, at the point when the oxygen sensor outputs its signal, then the feedback control begins a leaning program by first creating a large reduction in the amount of fuel flow and then stepping the reduction down slowly until the oxygen sensor no longer outputs its signal. Then the program repeats in an enriching direction making a large initial adjustment and then smaller adjustments until the oxygen sensor again outputs its signal.

Figure 9:
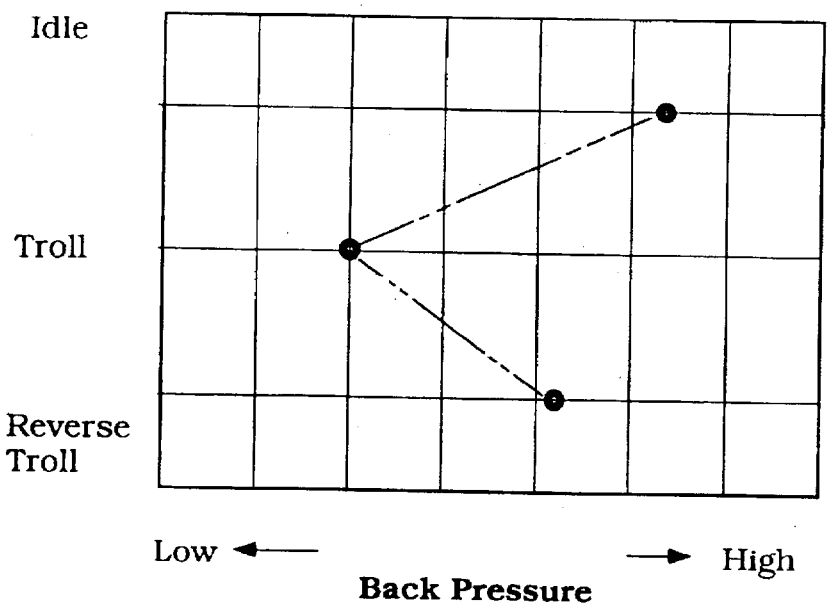
FIG. 9 is a graphical view showing the exhaust back pressure under three operating conditions of the outboard motor: idle, forward trolling, and reverse trolling.

The actual air fuel ratio to achieve stoichiometric also varies in response to the operating condition of the associated watercraft. FIG. 9 shows how the back pressure varies under some typical running conditions of a watercraft. It may be seen when the watercraft is stationary with the engine idling (transmission in neutral) forwardly with the engine at idling (idling speed) that the back pressure is higher than when operating at trolling speed. As is well known, trolling speed is lower than actual idle speed because of the power required to propel the boat through the body of water. Also the operation of the propeller and the movement of the watercraft in a forward direction assists in the exit to the exhaust gasses. On the other hand, when trolling in reverse, the back pressure goes up because of the fact that the direction of movement of the outlet of the exhaust discharge through the propeller is facing the direction of water flow, and hence there will be some ram affect that will restrict the flow of exhaust gases under this operational mode. Thus the system in the ECU 51 is also responsive to transmission condition.

Figure 10:
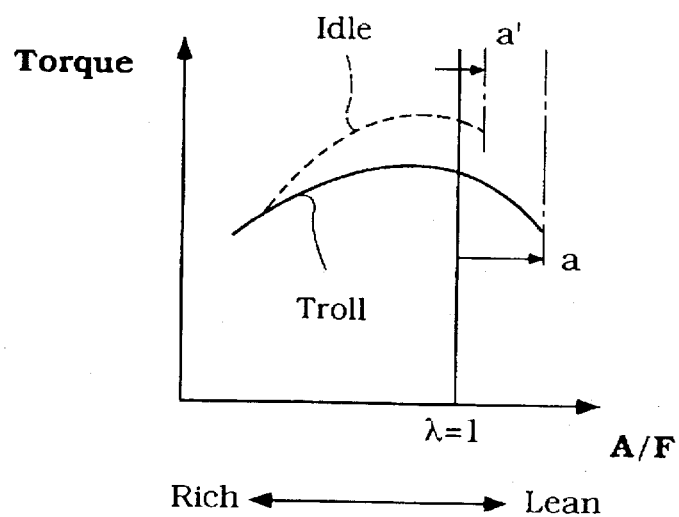
FIG. 10 is a graphical view showing the torque curves at idle and trolling with various mixture strengths, with stoichiometric conditions being shown in the solid vertical line λ=1
Figure 11:
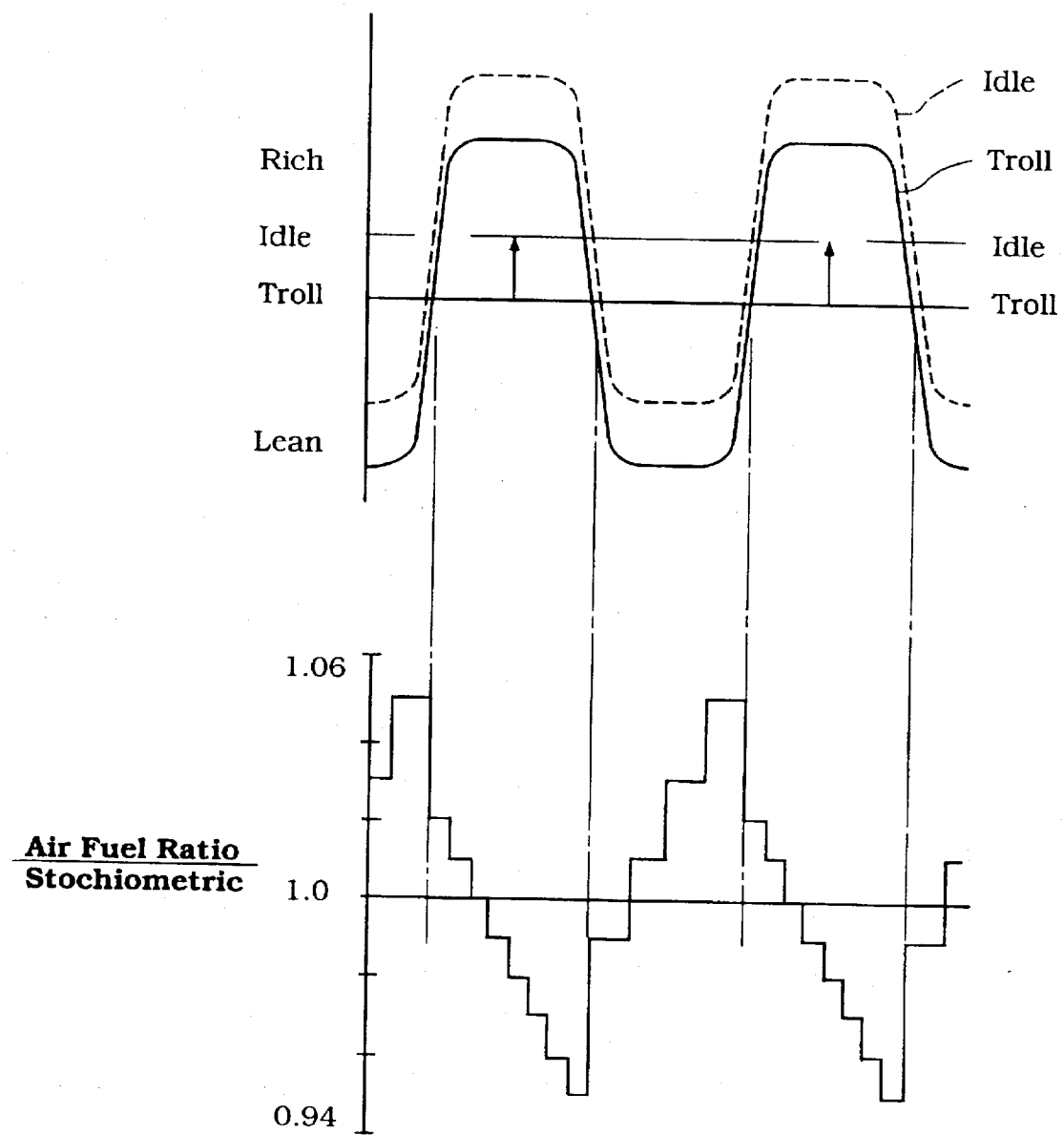
FIG. 11 is a view, in part similar to FIG. 8, but shows the feedback control conditions and oxygen sensor conditions at idle, as shown in the dotted-line view, and when trolling, as shown in the solid-line view.
Figure 12:
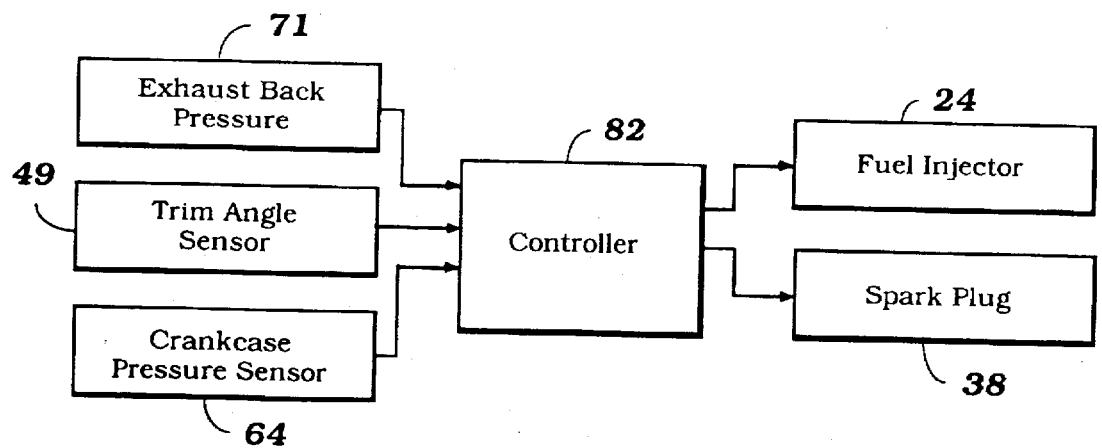
FIG. 12 is a block diagram showing the relationship of the back pressure, trim angle, and crankcase pressure sensors to the controller and how the fuel injection and spark timing are controlled in response to these signals.

FIG. 10 is a view showing the torque curves at various air fuel ratios when operating at idle as shown in the broken line view and when trolling as shown in the solid line view. As may be seen the range (a) when the engine has good combustion on the lean side is greater in troll than in idle (a'). This is also due to the reduced back pressure. FIG. 11 shows how the system compensates by changing the reference output of the oxygen sensor in response to the running conditions and illustrates the settings under idle and troll and the feedback operations under each system in order to maintain a stoichiometric condition regardless of operational mode of the watercraft so as to compensate for the variations in back pressure caused by these various operational modes as already noted.

Figure 13:
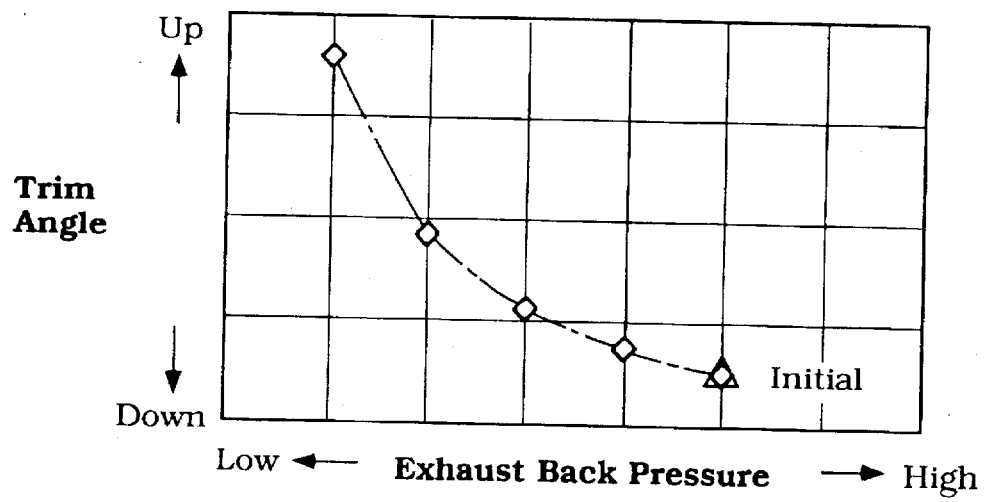
FIG. 13 is a graphical view showing the relationship of trim angle to exhaust gas back pressure.

In addition to the depth at which the exhaust is discharged and the speed of travel of the watercraft or its operational mode affecting the ideal air fuel ratio, the trim adjustment also has been found to affect these conditions. FIG. 13 shows how the trim angle affects exhaust pressure. When fully trimmed down, the exhaust back pressure is at its highest and the back pressure decreases, but not linearly as the drive is trimmed up.

Changing the trim not only changes the height of the exhaust outlet, but also its angle to the water. When fully trimmed down, the exhaust gases are directed totally at the water and have no significant component directed toward the air above the water. However, as the outboard drive is trimmed up, then the exhaust gas outlet through the hub propeller discharge begins to face upwardly and the exhaust gases can exit more easily because they need travel less distance to reach the atmosphere, and hence the back pressure will decrease.

Thus, it is also possible to employ a section, shown at the block 82 of the ECU 51, that receives not only exhaust back pressure signal from the sensor 71 and crankcase pressure from the sensor 64, but also the output of the trim sensor 49 so as to adjust not only the fuel injector 24 but also the timing of firing of the spark plugs 38.

Figure 14:
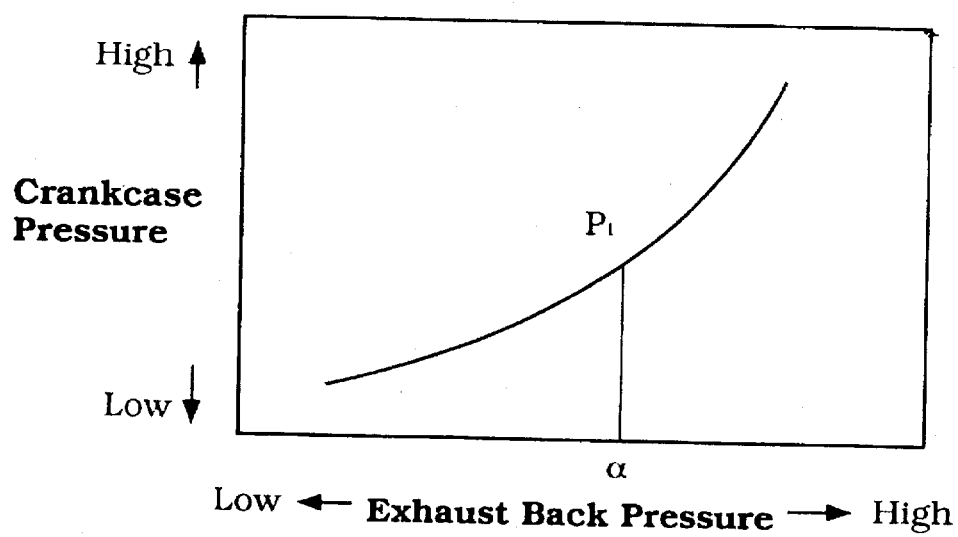
FIG. 14 is a graphical view showing how crankcase pressure varies as exhaust gas back pressure varies.
Figure 15:
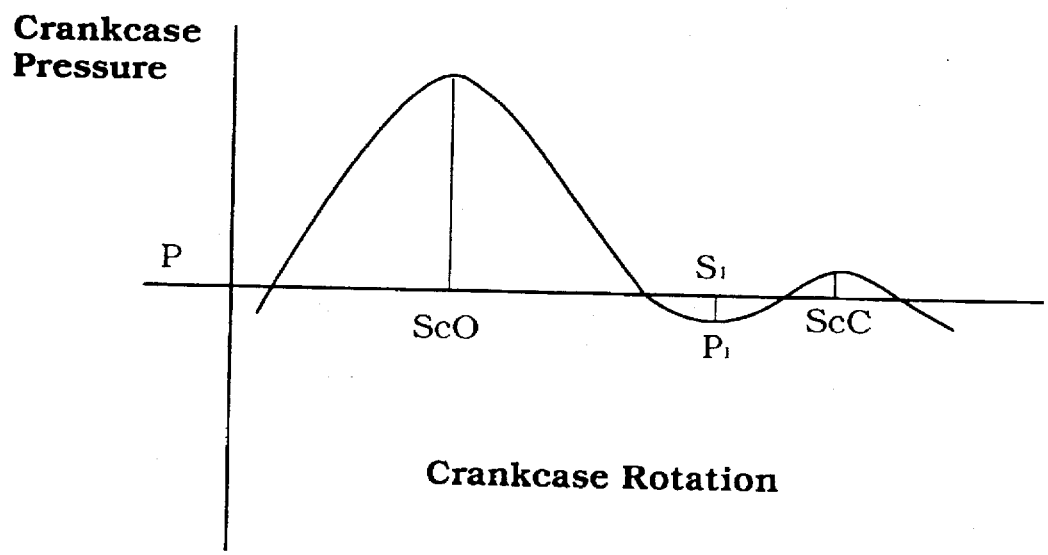
FIG. 15 is a graphical view showing how crankcase pressure varies during a portion of the rotation of the crankshaft.

FIGS. 14 and 15 are graphical views that show how the exhaust back pressure effects the crankcase pressure if all other things are constant. FIG. 15 is a graphical view and shows how the crankcase pressure varies during a cycle of operation reaching its maximum at the time when the scavenge port opens and falls to a minimum intermediate value at the time S1 and P1 before the scavenge port closes. It is this value P1 that is measured in accordance with the aforenoted method described in U.S. Pat. No. 4,461,260 that is employed to measure airflow.

FIG. 14 shows how the value of P1 varies with exhaust gas back pressure. If the back pressure is lower than normal, indicated by the point α, the crankcase pressure will be lower while as the exhaust back pressure increases the crankcase pressure will increase. Again, these functions are not linear. This is another reason why exhaust back pressure must be taken into account to obtain ideal feedback control because the airflow calculation which is based on the crankcase pressure will also vary dependent upon exhaust back pressure.

Figure 16:
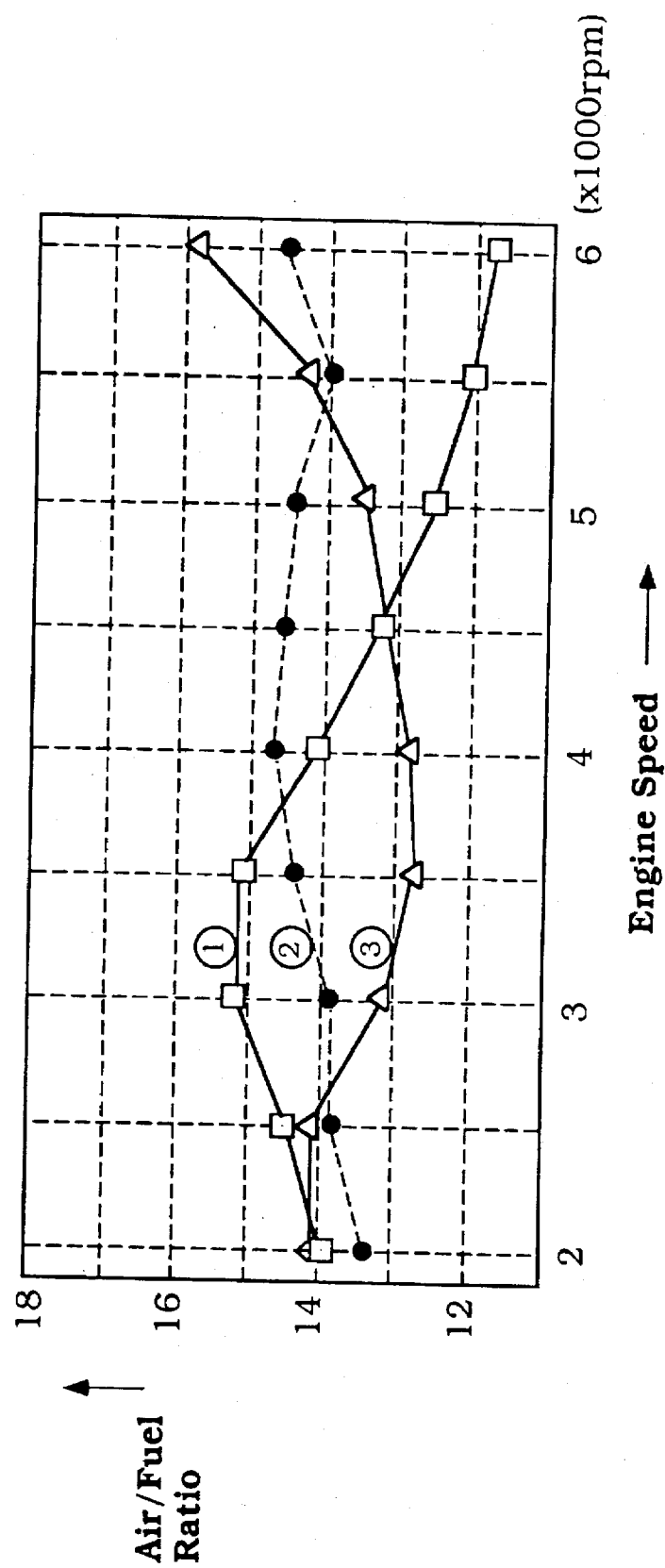
FIG. 16 is a graphical view showing how the air-fuel ratio in each cylinder varies in relation to engine speed when the mixture strength is set to be the same due to differences in distance between the end of the exhaust gas opening and the exhaust port of the respective cylinders.
Figure 17:
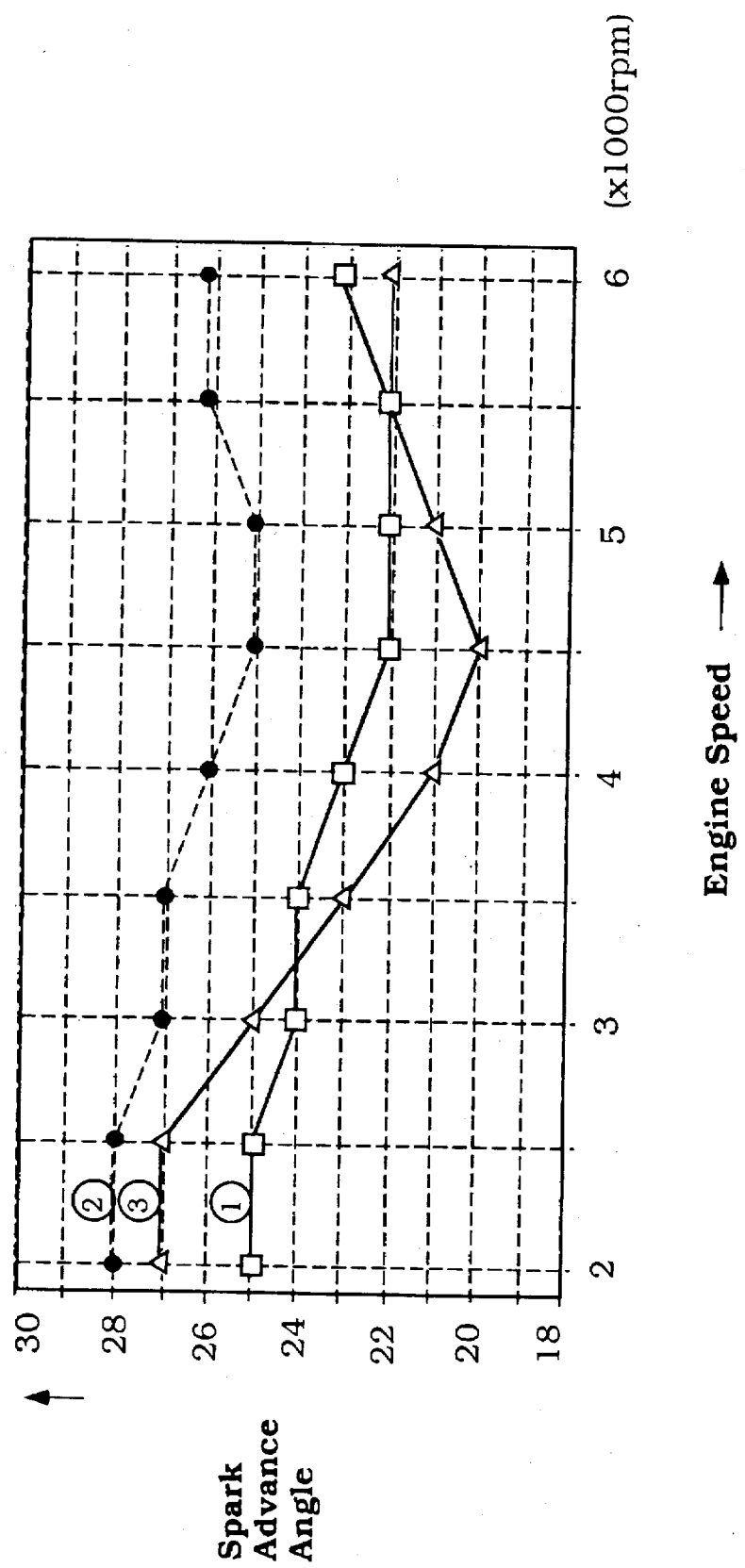
FIG. 17 is a graphical view showing how the spark advance angle should be varied with engine speed for each cylinder to compensate for the factors mentioned in conjunction with FIG. 16.
Figure 18:
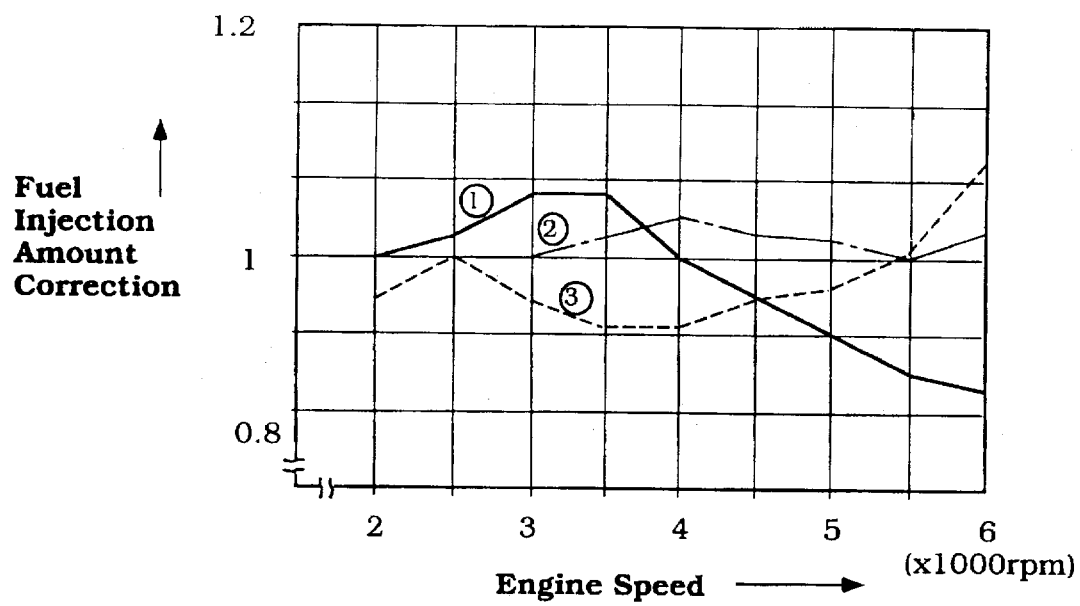
FIG. 18 is a graphical view showing how the fuel injection amount for each cylinder should be varied with engine speed so as to maintain the desired air-fuel ratio for each cylinder to compensate for the factors noted.
Figure 19:
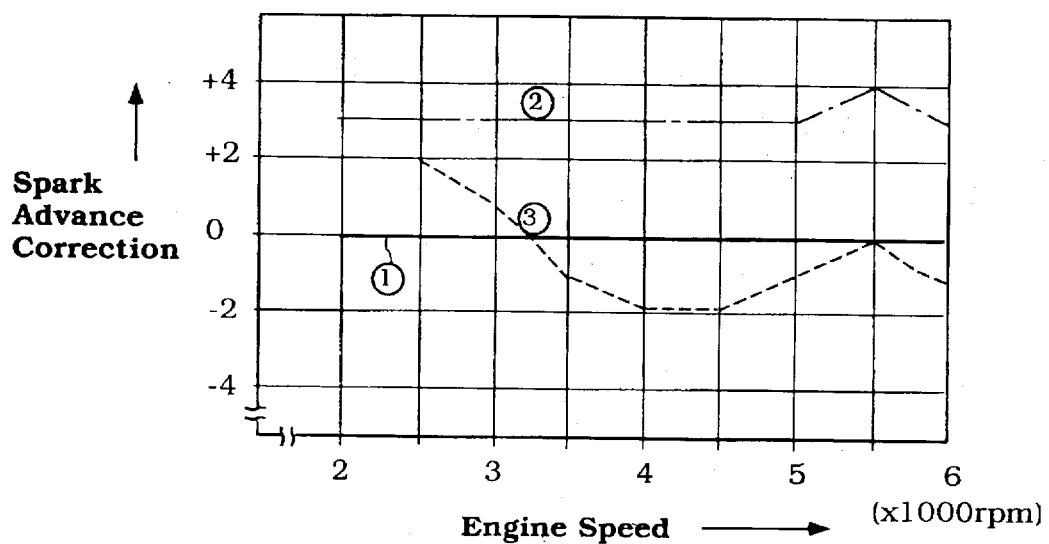
FIG. 19 is a graphical view showing how spark advance for each cylinder should be corrected in response to engine speed.

In addition to the factors which have already been discussed, it has also been discovered that the ideal air fuel ratio for the engine 12 varies cylinder by cylinder. Considering the number of cylinders as 1, 2 and 3, beginning at the top, it is found that since the exhaust manifold 41 which collects the exhaust gases from the exhaust port 39 must be relatively compact and, as is known, exhaust pulses are delivered back to the individual exhaust ports from the end of the exhaust pipe 44. The effect of this varies from cylinder to cylinder because of the fact that the exhaust ports 39 for each cylinder are disposed at different distance from the end of the exhaust pipe 44. The effect of this on both air fuel ratio and ideal spark advance is shown in FIGS. 16 and 17 which shows the air fuel ratio and ideal spark advance for each cylinder. Hence, in addition to the corrections already noted, the amount of adjustment or correction for each cylinder must be different and the ECU 51 also includes a map that provides the appropriate corrections to accommodate this situation. These corrective values in fuel injection amount and spark advance are shown in FIGS. 18 and 19.

Figure 23:
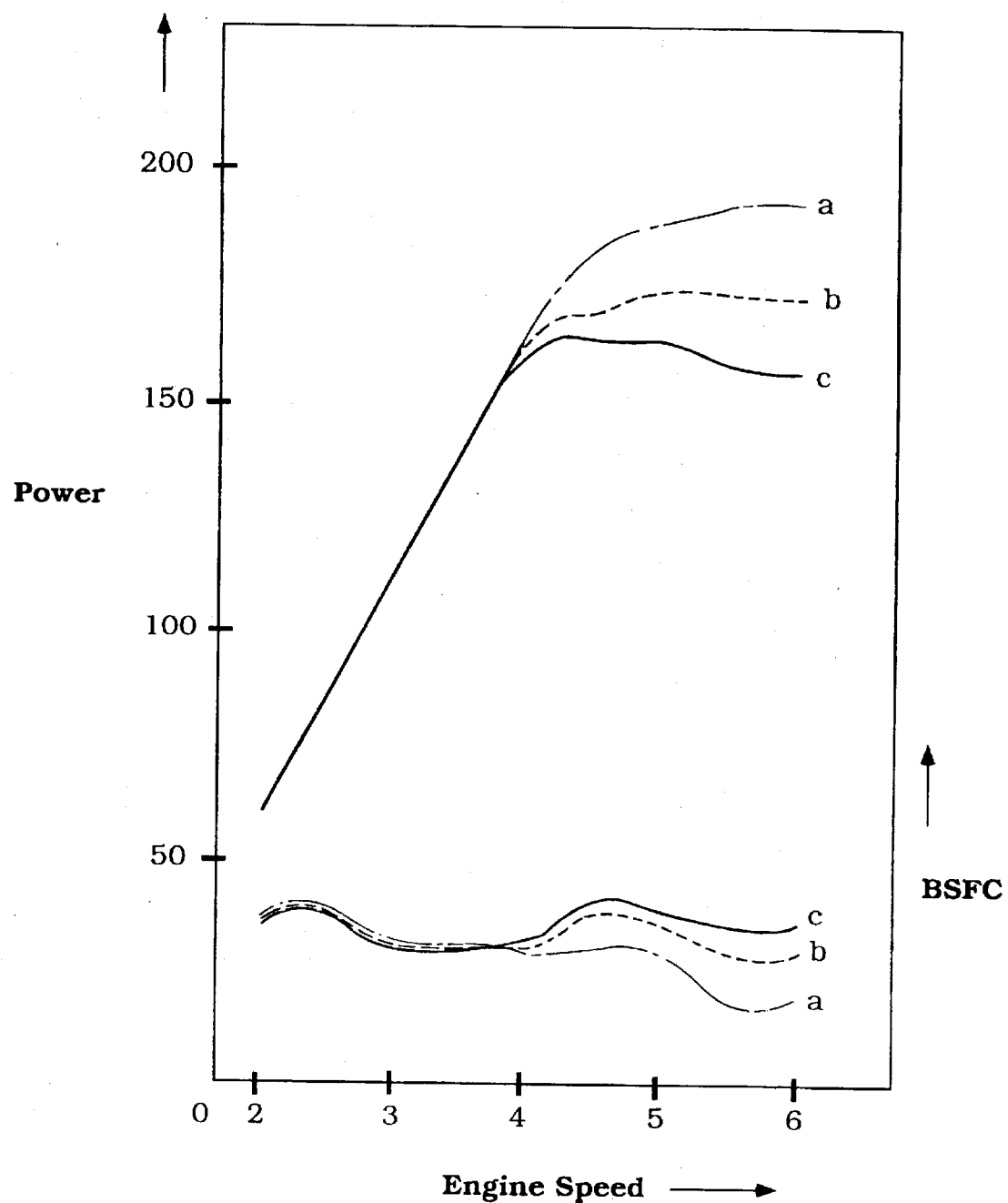
FIG. 23 is a graphical view showing power and brake specific fuel consumption in relation to engine speed with the various control routines to obtain different performances from the same engine.

From the foregoing description, it should be readily apparent that the feedback control system of the ECU 51 is highly effective in insuring that the stoichiometric or desired air fuel ratio is maintained not only by the engine 12 but within each of its cylinders. Also, it is believed that the foregoing description indicates the performance of the engine can be varied significantly by changing spark timing, fuel injection amount and fuel injection duration. This permits a single basic engine to be tuned by varying these factors to provide different power curves and break specific fuel consumption curves as shown in FIG. 23. By varying these factors, the power and BSFC curves can be varied as shown in the areas a, b and c, with the effect being particularly noticeable at the high end of the power curve.

Figure 20:
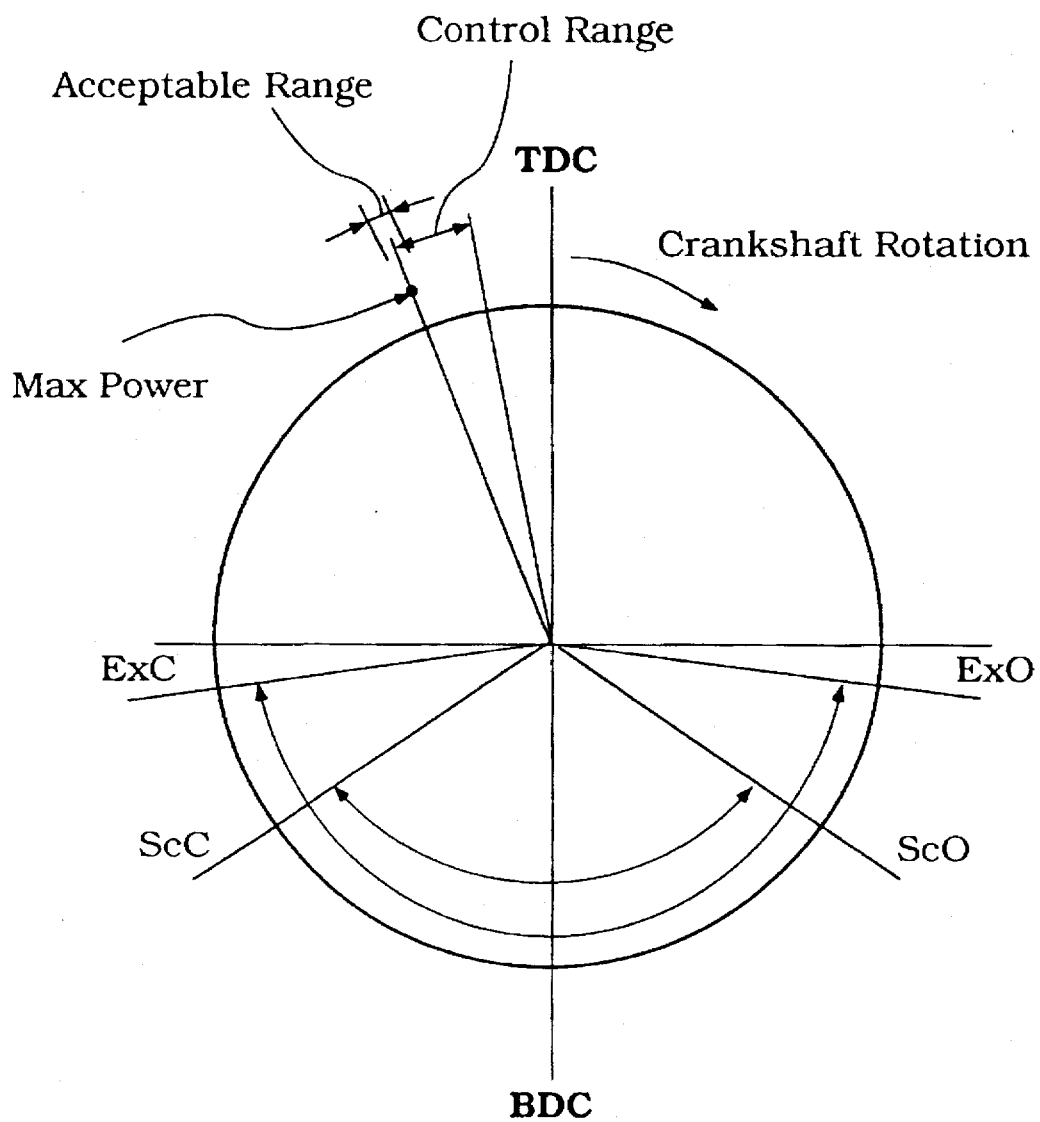
FIG. 20 is a graphical view showing a timing diagram showing the spark advance control range and the position for maximum power spark advance timing to illustrate how the performance of the engine can be varied by merely altering the control routine.
Figure 21:
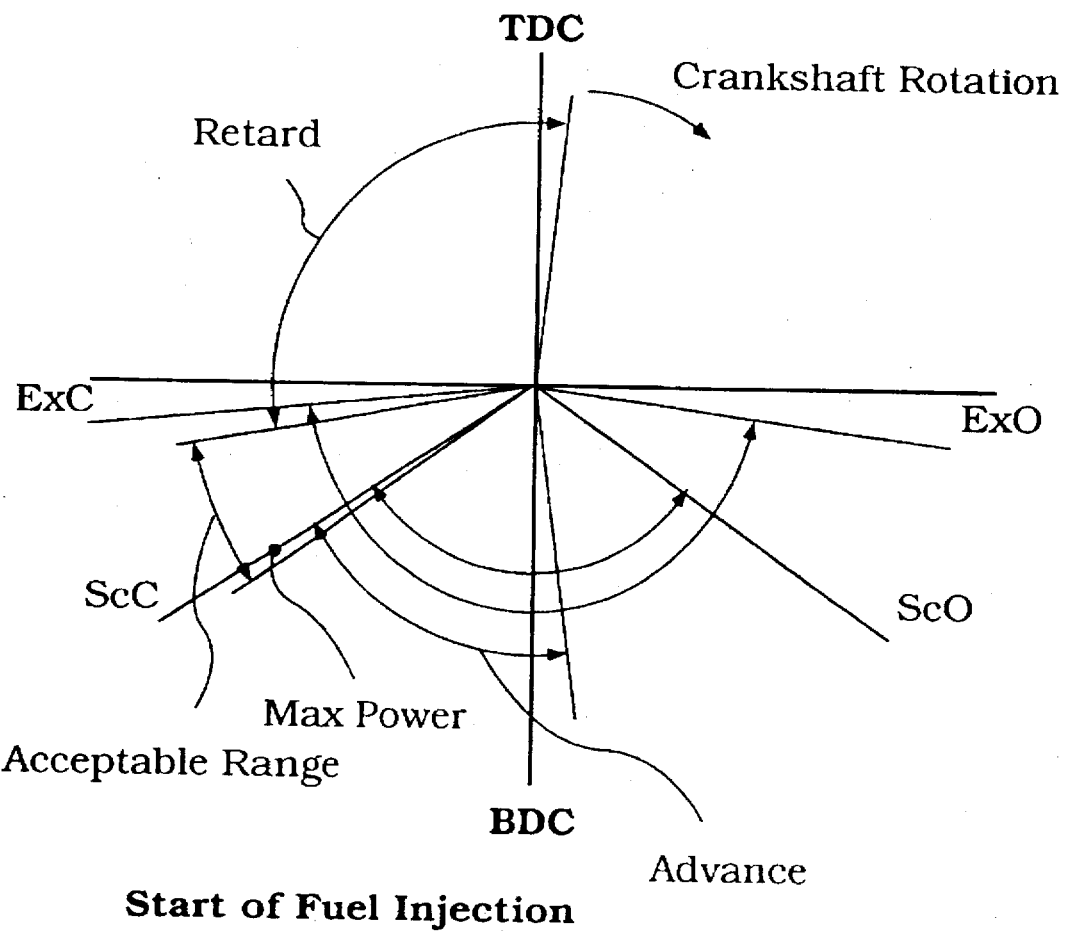
FIG. 21 is a graphical view showing the fuel injection initiation timing in response to crankshaft angle in order to permit variation in engine output by controlling this parameter.

FIG. 20 is a crankshaft timing diagram showing the control range of spark advance and how the maximum power can be changed within the acceptable range indicated in this figure so as to alter the engine performance. FIG. 21 is a corresponding timing diagram showing how the start of fuel injection can be employed to vary the power. This curve shows the point of beginning of fuel injection when maximum power can be achieved with is approximately at the time of scavenge port closing and an acceptable range within which the injection amount can be altered to reduce the power while, at the same time, providing generally good engine performance.

Figure 22:
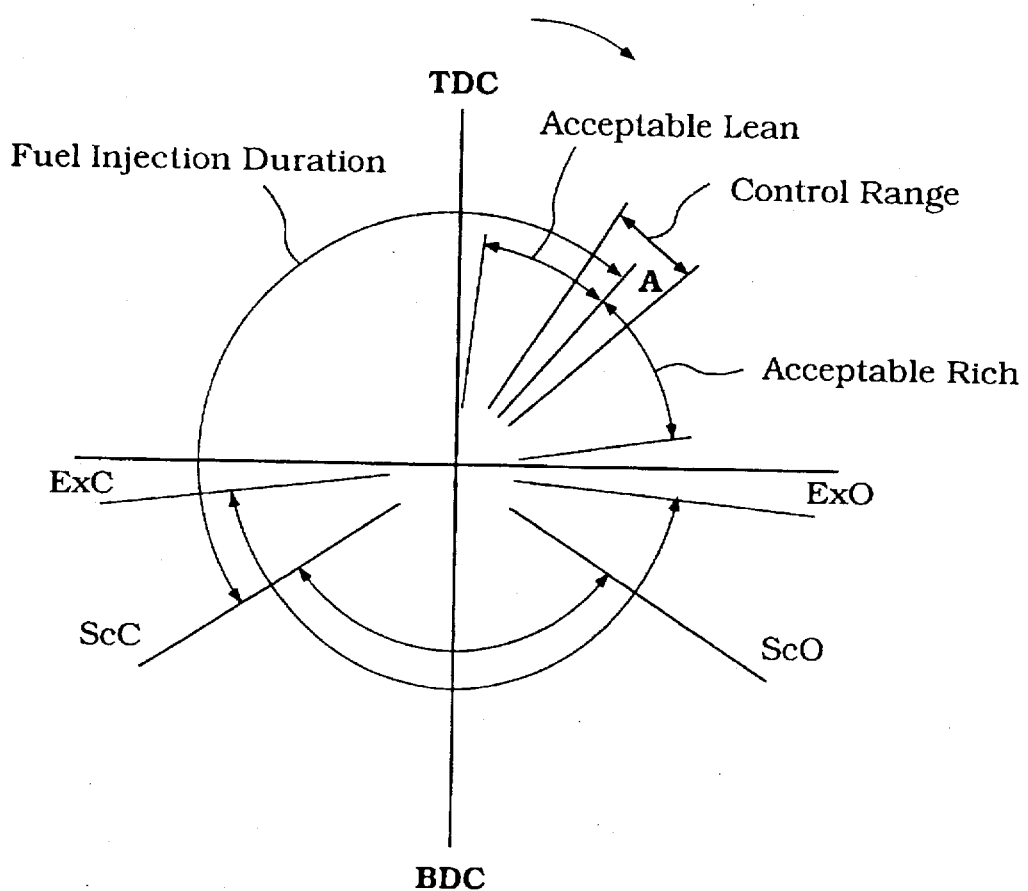
FIG. 22 is a timing diagram showing how fuel injection duration can be varied through varied engine output in accordance with the invention at maximum power.

FIG. 22 is a further view showing how the performance can be changed also by changing the fuel injection duration. This shows a curve using one of the injection timing starting points of FIG. 22 and shows how by changing the stopping time within the control range from the optimum performance point A, the performance can be varied. Thus, by employing these variables it is possible to have engines of a range of performances available even though the basic engine is identical. This changed performance can be merely programmed into the ECU 51 to achieve these performance variations.

It should be readily apparent from the foregoing description that the described embodiments are very effective in meeting the objects as set forth. Of course, various changes and modifications may be made without departing from the spirit and scope of the invention, as defined by the appended claims.

We claim:

1. A fuel control method for a two-cycle, crankcase compression, marine propulsion engine having a crankcase chamber containing a crankshaft, a fuel supply device for supplying fuel to the engine for combustion, a crankcase pressure sensor, an exhaust port for discharging exhaust gases from the engine, an exhaust system for collecting exhaust gases from the exhaust port and delivering them to the atmosphere through an exhaust outlet at least in part below the level of water in which the propelled vessel is traveling at least under certain running conditions, said method comprising the steps of sensing the crankcase pressure at least one specific angular position of the crankshaft, calculating an air flow amount from the sensed crankcase pressure, sensing a condition which will effect the back pressure in said exhaust system and adjusting the calculated amount of air flow in response to the sensed condition.

2. A fuel control method for a marine propulsion, internal combustion engine as set forth in claim 1, wherein the exhaust back pressure is sensed by a pressure sensor in the exhaust system.

3. A fuel control method for a marine propulsion, internal combustion engine as set forth in claim 1, wherein the exhaust outlet of the exhaust system is associated with a propulsion device for propelling the vessel and means are provided for changing the relation of the propulsion device and exhaust outlet relative to the vessel.

4. A fuel control method for a marine propulsion, internal combustion engine as set forth in claim 3, wherein the condition sensed is the relative position of the exhaust outlet and the propulsion device relative to the vessel.

5. A fuel control method for a marine propulsion, internal combustion engine as set forth in claim 4, wherein the relative position is determined by a trim sensor.

6. A fuel control method for a marine propulsion, internal combustion engine as set forth in claim 5, wherein the propulsion device and exhaust outlet are pivotally supported on the vessel and the sensing device senses the pivotal position.

7. A fuel control method for a marine propulsion, internal combustion engine as set forth in claim 1, wherein the engine is spark ignited and further including a spark control system for controlling the time at which the spark plug is fired.

8. A fuel control method for a marine propulsion, internal combustion engine as set forth in claim 7, wherein the spark timing is also adjusted in response to the sensed condition that effects the back pressure in the exhaust system.

9. A fuel control method for a marine propulsion, internal combustion engine as set forth in claim 8, wherein the exhaust back pressure is sensed by a pressure sensor in the exhaust system.

10. A fuel control method for a marine propulsion, internal combustion engine as set forth in claim 8, wherein the exhaust outlet of the exhaust system is associated with a propulsion device for propelling the vessel and means are provided for changing the relation of the propulsion device and exhaust outlet relative to the vessel.

11. A fuel control method for a marine propulsion, internal combustion engine as set forth in claim 10, wherein the condition sensed is the relative position of the exhaust outlet and the propulsion device relative to the vessel.

12. A fuel control method for a marine propulsion, internal combustion engine as set forth in claim 11, wherein the relative position is determined by a trim sensor.

13. A fuel control method for a marine propulsion, internal combustion engine as set forth in claim 3, wherein the propulsion device and exhaust outlet are pivotally supported on the vessel and the sensing device senses the pivotal position.

14. A fuel control method for an internal combustion engine having a plurality of cylinders, a fuel supply device comprising a plurality of charge formers, each supplying fuel to a respective cylinder of the engine, a plurality of exhaust ports in said engine for discharging combustion products from the respective cylinders thereof, an exhaust system for collecting exhaust gases from said exhaust ports comprising a collector section for collecting all of the exhaust gases and discharging them to the atmosphere through a common outlet, an air fuel ratio sensor for sensing the air fuel ratio supplied to the engine by the charge formers, said method comprising the steps of supplying fuel to said engine from said charger formers, reading the output of the air fuel sensor, adjusting the amount of fuel supplied to the engine by the charge formers in response to the output of the air fuel sensor to maintain the desired air fuel ratio and adjusting the amount of fuel supplied to each charger formers depending upon the distance of the exhaust port of the respective cylinder from the exhaust outlet.

15. A fuel control method for a marine propulsion, internal combustion engine as set forth in claim 14, further including the steps of sensing a condition that will effect the back pressure in the exhaust system, and adjusting the amount of fuel supplied to each of the cylinders in response to the sensed condition for compensating for variations in exhaust back pressure.

16. A fuel control method for a marine propulsion, internal combustion engine as set forth in claim 15, wherein the exhaust back pressure is sensed by a pressure sensor in the exhaust system.

17. A fuel control method for a marine propulsion, internal combustion engine as set forth in claim 15, wherein the exhaust outlet of the exhaust system is associated with a propulsion device for propelling the vessel and means are provided for changing the relation of the propulsion device and exhaust outlet relative to the vessel.

18. A fuel control method for a marine propulsion, internal combustion engine as set forth in claim 17, wherein the condition sensed is the relative position of the exhaust outlet and the propulsion device relative to the vessel.

19. A fuel control method for a marine propulsion, internal combustion engine as set forth in claim 18, wherein the relative position is determined by a trim sensor.

20. A fuel control method for a marine propulsion, internal combustion engine as set forth in claim 19, wherein the propulsion device and exhaust outlet are pivotally supported on the vessel and the sensing device senses the pivotal position.

21. A fuel control method for a marine propulsion, internal combustion engine as set forth in claim 15, wherein the engine is spark ignited and further including a spark control system for controlling the time at which the spark plug is fired.

22. A fuel control method for a marine propulsion, internal combustion engine as set forth in claim 21, wherein the spark timing for each cylinder is also adjusted in response to the sensed condition that effects the back pressure in the exhaust system.

23. A fuel control for a two-cycle, crankcase compression, marine propulsion engine having a crankcase chamber containing a crankshaft, a fuel supply device for supplying fuel to the engine for combustion, a crankcase pressure sensor, an exhaust port for discharging exhaust gases from the engine, an exhaust system for collecting exhaust gases from the exhaust port and delivering them to the atmosphere through an exhaust outlet at least in part below the level of water in which the propelled vessel is traveling at least under certain running conditions, means sensing the crankcase pressure at at least one specific angular position of the crankshaft, and calculating an air flow amount from the sensed crankcase pressure, means for sensing a condition which will effect the back pressure in said exhaust system and adjusting the calculated amount of air flow in response to the sensed condition.

24. A fuel control for a marine propulsion, internal combustion engine as set forth in claim 23, wherein the exhaust back pressure is sensed by a pressure sensor in the exhaust system.

25. A fuel control for a marine propulsion, internal combustion engine as set forth in claim 23, wherein the exhaust outlet of the exhaust system is associated with a propulsion device driven by the engine for propelling the vessel and means are provided for changing the relation of the propulsion device and exhaust outlet relative to the vessel.

26. A fuel control for a marine propulsion, internal combustion engine as set forth in claim 25, wherein the condition sensed is the relative position of the exhaust outlet and the propulsion device relative to the vessel.

27. A fuel control for a marine propulsion, internal combustion engine as set forth in claim 26, wherein the relative position is determined by a trim sensor.

28. A fuel control for a marine propulsion, internal combustion engine as set forth in claim 27, wherein the propulsion device and exhaust outlet are pivotally supported on the vessel and the sensing device senses the pivotal position.

29. A fuel control for a marine propulsion, internal combustion engine as set forth in claim 23, wherein the engine is spark ignited and further including a spark control system for controlling the time at which the spark plug is fired.

30. A fuel control for a marine propulsion, internal combustion engine as set forth in claim 29, wherein the spark timing is also adjusted in response to the sensed condition that effects the back pressure in the exhaust system.

31. A fuel control for a marine propulsion, internal combustion engine as set forth in claim 29, wherein the exhaust back pressure is sensed by a pressure sensor in the exhaust system.

32. A fuel control for a marine propulsion, internal combustion engine as set forth in claim 30, wherein the exhaust outlet of the exhaust system is associated with a propulsion device driven by the for propelling the vessel and means are provided for changing the relation of the propulsion device and exhaust outlet relative to the vessel.

33. A fuel control for a marine propulsion, internal combustion engine as set forth in claim 32, wherein the condition sensed is the relative position of the exhaust outlet and the propulsion device relative to the vessel.

34. A fuel control for a marine propulsion, internal combustion engine as set forth in claim 33, wherein the relative position is determined by a trim sensor.

35. A fuel control for a marine propulsion, internal combustion engine as set forth in claim 33, wherein the propulsion device and exhaust outlet are pivotally supported on the vessel and the sensing device senses the pivotal position.

36. A fuel control for an internal combustion engine having a plurality of cylinders, a fuel supply device comprising a plurality of charge formers, each supplying fuel to a respective cylinder of the engine, a plurality of exhaust ports in said engine for discharging combustion products from the respective cylinders thereof, an exhaust system for collecting exhaust gases from said exhaust ports comprising a collector section for collecting all of the exhaust gases and discharging them to the atmosphere through a common outlet, an air fuel ratio sensor for sensing the air fuel ratio supplied to the engine by the charge formers, means for controlling the supply of fuel to said engine from said charger formers and adjusting the amount of fuel supplied to the engine by the charge formers in response to the output of said air fuel sensor to maintain the desired air fuel ratio and adjusting the amount of fuel supplied to each charger formers depending upon the distance of the exhaust port of the respective cylinder from the exhaust outlet.

37. A fuel control for a marine propulsion, internal combustion engine as set forth in claim 36 further including means for sensing a condition that will effect the back pressure in the exhaust system and adjusting the amount of fuel supplied to each of the cylinders in response to the sensed condition for compensating for variations in exhaust back pressure.

38. A fuel control for a marine propulsion, internal combustion engine as set forth in claim 37, wherein the exhaust back pressure is sensed by a pressure sensor in the exhaust system.

39. A fuel control method for a marine propulsion, internal combustion engine as set forth in claim 37, wherein the exhaust outlet of the exhaust system is associated with a propulsion device driven by the engine for propelling the vessel and means are provided for changing the relation of the propulsion device and exhaust outlet relative to the vessel.

40. A fuel control for a marine propulsion, internal combustion engine as set forth in claim 39, wherein the condition sensed is the relative position of the exhaust outlet and the propulsion device relative to the vessel.

41. A fuel control for a marine propulsion, internal combustion engine as set forth in claim 40, wherein the relative position is determined by a trim sensor.

42. A fuel control for a marine propulsion, internal combustion engine as set forth in claim 41, wherein the propulsion device and exhaust outlet are pivotally supported on the vessel and the sensing device senses the pivotal position.

43. A fuel control for a marine propulsion, internal combustion engine as set forth in claim 37, wherein the engine is spark ignited and further including a spark control system for controlling the time at which the spark plug is fired.

44. A fuel control for a marine propulsion, internal combustion engine as set forth in claim 43, wherein the spark timing for each cylinder is also adjusted in response to the sensed condition that effects the back pressure in the exhaust system.

* * * * *